(12) United States Patent
Haydon et al.

(10) Patent No.: US 6,581,730 B1
(45) Date of Patent: Jun. 24, 2003

(54) AIRCRAFT LANDING GEAR WITH INTEGRATED BRAKE ACTUATION SYSTEM

(75) Inventors: Thomas H. Haydon, Troy, OH (US); Derolle E. Haugen, Dayton, OH (US); Franklin C. Christ, Pompton Plains, NJ (US); Mihai Ralea, Boonton Township, NJ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/659,995

(22) Filed: Sep. 12, 2000

Related U.S. Application Data

(60) Provisional application No. 60/153,510, filed on Sep. 13, 1999.

(51) Int. Cl.[7] .............................................. F16D 55/36
(52) U.S. Cl. ................................... 188/71.5; 188/18 A
(58) Field of Search ............................ 188/71.5, 18 A, 188/71.9, 72.8, 162

(56) References Cited

U.S. PATENT DOCUMENTS

| | | | | |
|---|---|---|---|---|
| 4,542,809 A | * | 9/1985 | Crossman ................... | 188/161 |
| 4,569,600 A | * | 2/1986 | Preniczny et al. ...... | 188/1.11 E |
| 4,596,316 A | * | 6/1986 | Crossman ................... | 188/158 |
| 4,703,837 A | * | 11/1987 | Guichard ................ | 188/264 G |
| 4,865,162 A | * | 9/1989 | Morris et al. ................ | 188/158 |
| 5,255,761 A | * | 10/1993 | Zaremsky .................. | 188/18 A |
| 5,323,881 A | * | 6/1994 | Machan et al. ........... | 188/18 A |
| 5,862,890 A | * | 1/1999 | Long et al. ................. | 188/71.5 |
| 6,095,293 A | * | 8/2000 | Brundrett et al. ......... | 188/18 A |
| 6,241,052 B1 | * | 6/2001 | Berwanger .................. | 188/71.5 |

* cited by examiner

*Primary Examiner*—Jack Lavinder
*Assistant Examiner*—Benjamin A Pezzlo
(74) *Attorney, Agent, or Firm*—Renner, Otto, Boisselle & Sklar, LLP

(57) ABSTRACT

An aircraft brake assembly, wherein the actuator portion of the brake assembly is no longer provided as part of the brake assembly but instead as part of the aircraft landing gear. Accordingly, the actuator portion or individual actuators assemblies are designated as Line Replacement Units (LRUs), which are replaceable independently of other brake components, e.g., the torque tube and heat sink, which then comprise the brake assembly designated as a separate LRU. This new arrangement is particularly suited to electro-mechanically actuated brakes, where actuator maintenance intervals will typically be more closely related to landing gear maintenance intervals than to brake maintenance (i.e., hydraulic actuator and/or heat sink maintenance). The invention also provides for more effective and desirable mounting of one or more electro-mechanical actuators wherein reactionary loads are transferred in compression as opposed to in tension through mounting bolts or other removable fasteners.

18 Claims, 3 Drawing Sheets

AIRCRAFT LANDING GEAR WITH INTEGRATED BRAKE ACTUATION SYSTEM

This application claims the benefit of provisional application 60/153,510 filed Sep. 13, 1999.

FIELD OF THE INVENTION

The invention herein described relates generally to aircraft landing gear and, more particularly, to aircraft landing gear with an integrated brake actuation system.

BACKGROUND OF THE INVENTION

Aircraft brake assemblies have traditionally been comprised of three major functional components, a torque tube, an actuator assembly and a heat sink (brake disk stack). These components are assembled into a brake assembly, which is known as a Line Replaceable Unit (LRU). An LRU is removed and replaced on a flight line as a single component. Accordingly, if one of the major functional components requires repair or replacement, removal of the entire LRU is effected for transfer of the LRU to a specialty shop for disassembly, repair and acceptance testing. This is an inefficient use of resources when one of the components requires more frequent servicing than the other components.

SUMMARY OF THE INVENTION

The present invention provides a different aircraft brake assembly, wherein the actuator portion of the brake assembly is no longer provided as part of the brake assembly but instead as part of the aircraft landing gear. Accordingly, the actuator portion or individual actuators assemblies are designated as LRUs, which are replaceable independently of other brake components, e.g., the torque tube and heat sink, which then comprise the brake assembly designated as a separate LRU. This new arrangement is particularly suited to electro-mechanically actuated brakes, where actuator maintenance intervals will typically be more closely related to landing gear maintenance intervals than to brake maintenance (i.e., hydraulic actuator and/or heat sink maintenance).

Accordingly, the invention provides a wheel and brake assembly comprising a wheel support, a wheel rotatably mounted on the wheel support, a torque transfer member coupled to the wheel support for transfer of torque from the brake disk stack to the wheel support during braking, a brake disk stack supported on the torque tube, and an actuator assembly mounted on the wheel support for applying force to said brake disk stack, wherein the brake disk stack and torque transfer member are removable from the wheel support without removal of the actuator assembly.

In a preferred embodiment, the brake disk stack is carried on the torque transfer member and removable therewith as a unit from the wheel support. The actuator includes a plurality of actuator modules individually removably mounted to the wheel support. The wheel support has at least one flange thereon to which the actuator modules are mounted, and the actuator modules have at least one mounting flange secured to an outboard side of the at least one flange. More generally, the actuator modules have one or more mounting flanges abutting axially outwardly facing mounting surfaces on the wheel support. The torque transfer member may be a torque tube having a mounting ring, and the mounting ring may be retained on the wheel support by a retainer and a thrust bearing interposed between the retainer and the rhounting ring.

In an embodiment of the invention, the torque transfer member may be relatively rotatable on the wheel support, and the torque transfer member and wheel support may include a cooperating lug and recess interengaged to transfer torque for the torque transfer member to the wheel support. A load transducer may be interposed between the lug and recess for sensing the transferred braking load.

According to another aspect of the invention, a wheel and brake assembly comprises a wheel support, a wheel rotatably mounted on the wheel support, a torque transfer member coupled to the wheel support for transfer of torque from the brake disk stack to the wheel support during braking, a brake disk stack supported on the torque tube, and an actuator assembly mounted on the wheel support for applying braking force to the brake disk stack, wherein the actuator includes a plurality of actuator modules individually removably mounted to the wheel support, and the actuator modules have at least one mounting flange abutting axially outwardly facing mounting surface on the wheel support.

In a preferred embodiment, each actuator module includes a housing, a reciprocating ram mounted in the housing, an electric motor, and rotary-to-linear motion transfer device connecting the motor to the ram, and wherein the reactionary axial loads caused by the motion transfer device are passed as compression loads from the motion transfer device to the mounting flange.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION OF THE INVENTION

Because the invention was conceived and developed for use in an aircraft braking system, it will be herein described chiefly in this context. However, the principles of the invention in their broader aspects can be adapted to other types of braking systems, such as in train braking systems.

Figure 2:
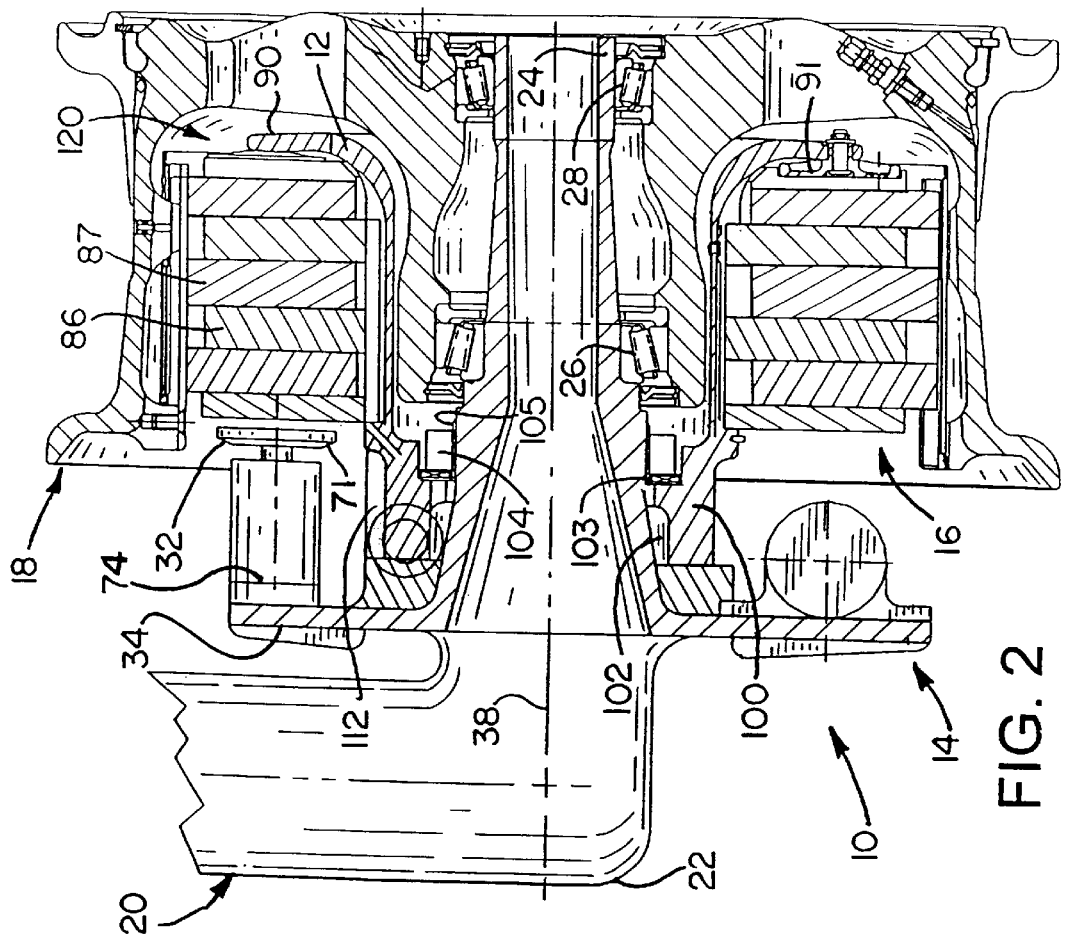
FIG. 2 is a schematic cross-sectional view of the wheel, brake and axle assembly of FIG. 1, taken along the line 2—2 of FIG. 2.
Figure 1:
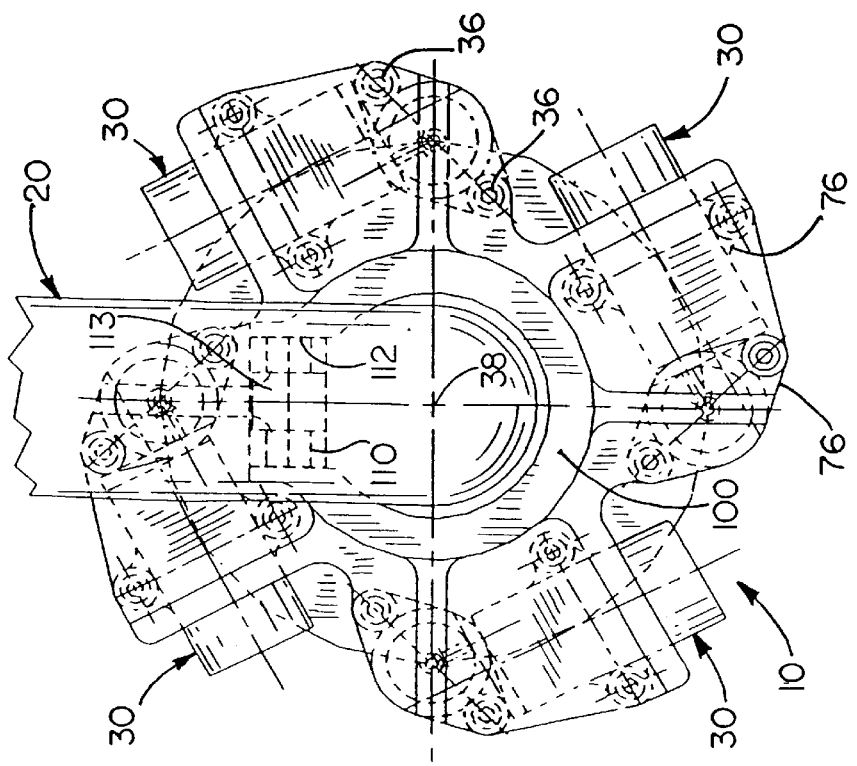
FIG. 1 is a schematic lay-out view of a wheel, brake and axle assembly according to the invention.

Referring now in detail to the drawings and initially to FIGS. 1 and 2, a wheel and brake assembly according to the present invention is generally indicated at 10. The assembly 10 generally comprises a torque tube 12, an actuator assembly 14, a brake disk stack (heat sink) 16, a wheel 18 and a wheel support 20. In the illustrated embodiment the wheel support 20 is a landing gear strut 22 provided with an axle 24. The wheel 18 is supported for rotation by inboard and outboard bearings 26 and 28 on the axle 24.

The actuator assembly 14 comprises one or more actuator modules 30 which include respective actuator rams 32. The actuator modules 30 are individually mounted to one or more support flanges 34 by removable bolt fasteners 36 or other suitable means enabling quick and easy attachment and detachment of the actuator modules to and from the flanges 34. As shown in FIG. 1, a plurality of the actuator modules 30 are mounted in a circular arrangement around the rotational axis 38 of the wheel, preferably with the actuator rams 32 circumferentially equally spaced apart. Electrical connectors (not shown) may be provided to effect quick and easy electrical connection of the actuators to a brake controller (not shown). The controller may include a corresponding number of independent servo amplifiers, a microprocessor with associated peripherals, and data input/output (I/O) circuitry. Details of the controller are not being described herein as the invention does not reside in the type of controller or other circuitry used to control operation of the actuator modules.

In the illustrated embodiment, the support flanges 34 are integrally joined to the axle 24 and radiate from the axle in a generally symmetric pattern. However, it will be appreciated that the flanges may be integrated in the axle or strut, or the wheel support in general. Also, the flanges may by removably attached to the axle by suitable means, such as by fasteners to a mounting flange or other mounting structure on the axle, strut or wheel support in general. The flanges may also be formed by respective portions of a continuous flange, such as an annular flange surrounding the axle. This annular flange may be removably mounted to the axle, strut or wheel support in general, for removal of the actuator assembly 14 as a unit.

Figure 4:
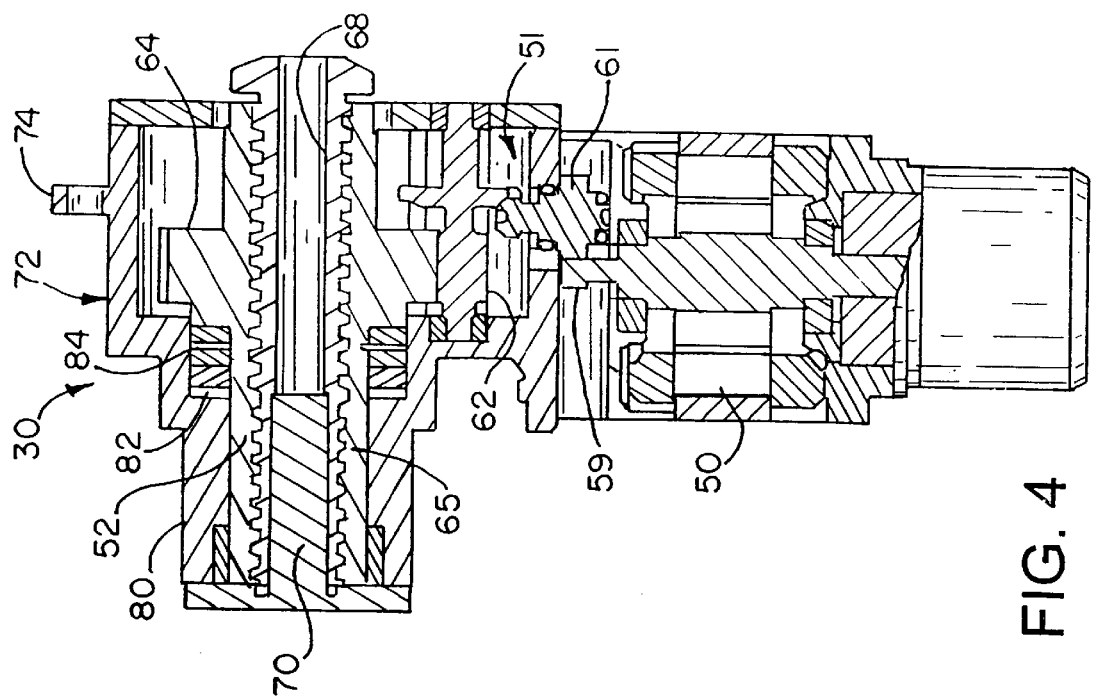
FIG. 4 is a cross-sectional view of the actuator module of FIG. 3.
Figure 3:
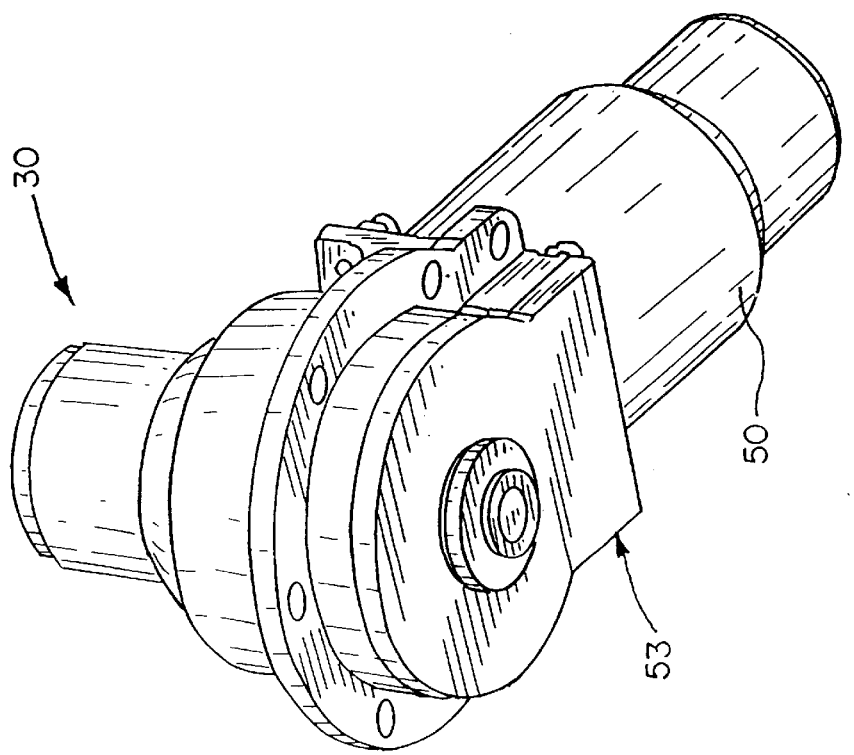
FIG. 3 is a perspective view of a representative actuator module that may be used in the wheel and brake assembly of FIG. 1.

Preferably, the modules 30 are identical and interchangeable, and a representative one of the actuator modules is shown in FIGS. 3 and 4. Each actuator module 30 includes an electric motor 50, a gear train 51, and a ball screw assembly 52. The gearing 51 includes a pinion 59 on the drive shaft of the electric motor 50, a first-stage transfer gear member 61 in mesh at it input end with the pinion, a second stage transfer gear member 62 in mesh at its input end with the output end of the first stage gear member, and a ball nut gear 64 in mesh with the output end of the second stage gear. The ball nut gear may be formed integrally with the ball nut 65 of the ball screw assembly 52 (although reference herein is made to certain structures as being integral as is preferred, it should be understood such structures alternatively may be composed of discrete components joined together to form a functionally equivalent structure).

The ball screw assembly 52 is comprised of the ball nut 65 with the integral gear 64, a ball screw 68 that moves linearly upon rotation of the ball nut, an anti-rotation guide 70 extending into the hollow interior of the ball screw, and a ram pad 71 (FIG. 2) that attaches to the end of the ball screw and provides an insulating interface with the brake disk stack (FIG. 2). The ball screw and ball nut may be of a known configuration and thus the respective spiral grooves thereof and associated balls have not been illustrated as the same would be immediately evident to one skilled in the art. Also, other rotary to linear motion conversion devices may by employed, if desired, with the linear moving member coinciding with the ball screw and functioning as the actuator ram. In the illustrated ball screw assembly, the interior bore of the screw and the anti-rotation guide have corresponding polygonal cross-sections defined by plural inner/outer side surfaces which rotationally interfere with one another to restrain rotation of the screw relative to the housing. As is preferred and illustrated, one or more of the side surfaces, most preferably all of the side surfaces, are planar and form regular polyhedrons providing a close sliding fit between the ball screw and the guide rod. It will be appreciated, however, that other configurations may be used although less preferred.

The motor 50, gearing 51 and ball screw assembly 52 are all carried in a module housing 72. The housing 72 includes a mounting flange 74 which may be a continuos flange extending completely or, as illustrated, partway around the casing. The mounting flange alternatively may be composed of discrete elements such as lugs. In the schematic renderings of FIGS. 1 and 2, the depicted mounting flange can be seen to be composed of lugs 76 protruding at strategic locations from the sides of the housing.

In accordance with the invention, the mounting flanges 74 of the actuator modules 30 are preferably abuttedly engaged with the outboard sides of the respective support flanges 34, i.e., the side thereof nearest the brake disk stack 16. This is advantageous because the axial braking loads will then be passed from the actuator to the flange without passing through removable fasteners or other devices used to attach the actuator modules to the flanges and which would be subjected to tensile loads. Accordingly, one or more smaller and lighter fasteners can be used to effect such attachment, as they need not be design rated to carry the large axial tension loads encountered during braking. Preferably, the actuators and flanges are configured to enable removal of the actuators from the flanges without disturbing the brake assembly consisting of the brake disks and torque tube. If needed, the ram pad may be removed to facilitate removal of the actuator. The actuator housing may also be provided with a spiral flange for bayonet-like assembly to the flange, which is provided with a mating spiral surface.

In addition, it may be desirable to design the actuator module 30 such that the axial loads are carried by a major housing portion that abuttedly engages the outboard side of the mounting flange directly or through a mounting flange thereon, rather than by fasteners. This would enable further weight reduction. As seen in FIG. 4, the housing 72 may be primarily composed of an outer housing member or casing 80 that includes the mounting flange 74 integrally therewith. The casing 80 has an axially facing shoulder surface 82 with bears the axial reactionary loads generated by the ball screw assembly 52 during braking. As shown, the ball nut 65 bears against such shoulder surface via an axial thrust bearing 84.

Reverting to FIGS. 1 and 2, the brake disk stack 16 is composed of stationary brake elements and rotary brake elements that are interleaved and surround the torque tube 12. The stationary and rotary brake elements are in the form of stator disks 86 and rotor disks 87. The stator disks 86 are splined to the torque tube 12 and the rotor disks 87 are splined to the wheel 18 interiorly of the wheel's rim. As is conventional, the splined connection may be effected by a plurality of spline or drive keys that are spaced around the circumference of the rim/torque tube to permit axial movement of the rotor/stator disks while being held to the wheel/torque tube against relative rotation.

The disk stack 16 is located between a back pressure member 90 and the actuator rams of the actuator assembly. The back pressure member 90 is formed by a radial flange at the outer end of the torque tube 12. The radial flange carries thereon a plurality of circumferentially spaced torque pucks 91 engaged with the last brake disk at the rear end of the disk stack 16.

The torque tube 12 has at its inboard end a mounting ring or flange 100 which has a contoured counterbore that fits over a correspondingly contoured locating collar 102 on the axle 24. When the torque tube is telescoped over the axle and the counterbored end portion thereof is seated against the locating collar, the torque tube can be axially retained by a thrust bearing 103 and a retainer nut 104 threaded onto a threaded portion 105 of the axle 24. The thrust bearing is interposed between the retainer nut and an axially outwardly facing shoulder surface on the interior wall of the torque tube at it inboard end. Preferably, the thrust bearing is lightly pre-loaded by the retainer nut to minimize the amount of braking torque reacted through the axle. This allows essentially all of the braking torque to be reacted through a load transducer 110 incorporated as part of the landing gear.

The mounting ring 100 includes a recess (socket) 112 for receiving the load transducer and a torque take-out lug 113 provided on the axle 24 or elsewhere on the wheel support 20. The torque take-out lug and recess are rotationally interlocked and function as an interface between the torque tube and the landing gear axle structure. The output of the load cell 110 will be indicative of brake torque, and the load cell output may be supplied to a brake controller for use in controlling the braking operation.

Although it will be immediately evident to those skilled in the art, the purpose of the brake actuator(s) is to impress a clamping force on a stack of brake disk elements. The electro-mechanical (EM) actuators operate simultaneously to produce a clamping force between a brake reaction or back pressure member 90 and the actuator output rams 32. The size and number of actuators may be varied to provide the total brake clamping force required.

The thrust bearing 103 can be eliminated if the brake torque transducer 110 is integrated into the axle or landing gear. In such design, the brake structure can be rigidly connected to the axle such as by using a bolted flange joint, a combination of bolts and studs, etc.

In view of the foregoing, it will now be appreciated that there is provided a wheel and brake assembly that enables the brake assembly (brake disk stack and torque tube), indicated at 120, to be replaced without disturbing the actuators 30. More particularly, the torque tube 12 can be removed without removal of and/or disturbing the actuators 30. This eliminate possible handling damage of the actuators during brake removal. To retain the brake disks on the torque tube when the brake assembly is removed, a snap ring may be provided.

In addition, individual actuators 30 can be replaced as an LRU without disturbing the remaining actuators or the brake assembly 120. Also, the brake assembly, sans actuators, is lighter in weight and easier to handle.

Figure 6:
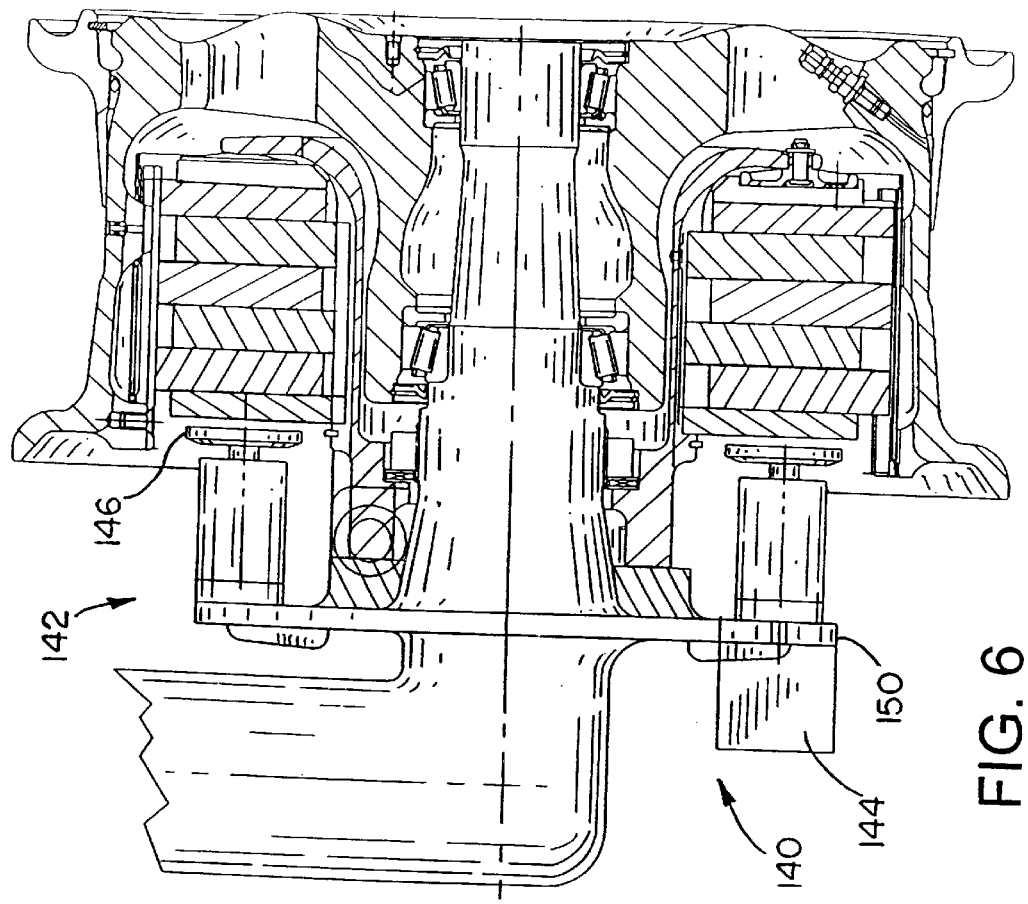
FIG. 6 is a schematic cross-sectional view of the wheel, brake and axle assembly of FIG. 5, taken along the line 6—6 of FIG. 5.
Figure 5:
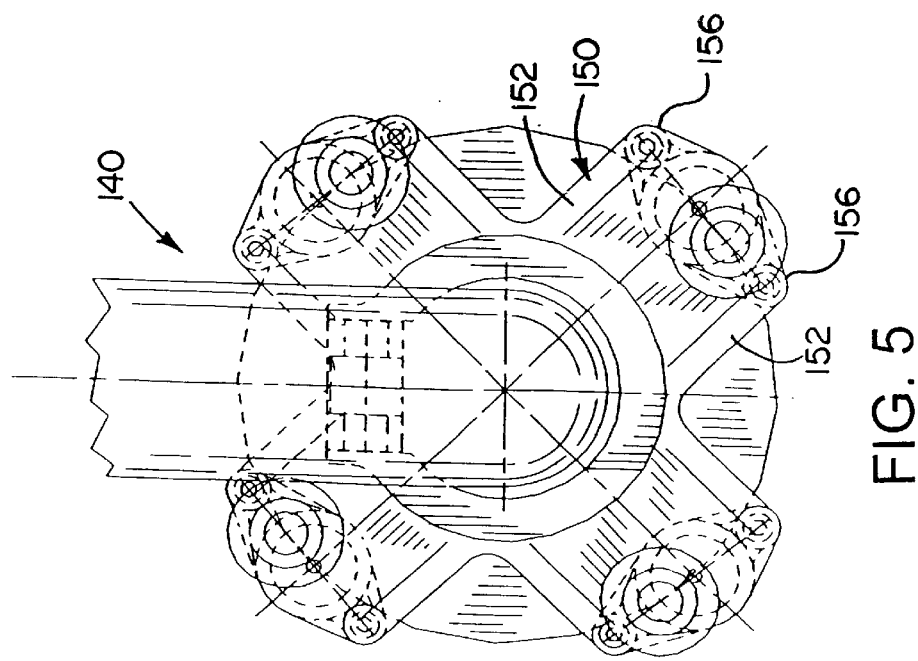
FIG. 5 is a schematic lay-out view of another embodiment of wheel, brake and axle assembly according to the invention.

In FIGS. 5 and 6, another embodiment of brake and wheel assembly is illustrated. The assembly 140 is the same as the above-described assembly, except for the actuator assembly 142. In the FIGS. 1 and 2 embodiment, the motor 144 is oriented with its axis perpendicular to the axis of the ram 146. In the FIGS. 5 and 6 embodiment, the motor is oriented with its axis parallel with the ram axis. This arrangement is more conducive to locating the motor more remote from the brake assembly including the torque tube and brake disks. The flanges 150 to which the actuators are mounted will include an aperture for passage of the motor and/or gear train connecting the motor to the ram. As shown, the flanges each may include a pair of generally radially outwardly extending arms 152 that are parallel and spaced apart to receive therebetween the actuator assembly. The actuator assembly includes a mounting flange in the form of opposed lugs through which fasteners extend to secure the actuator assembly to the mounting flanges. As shown, the lugs 156 are disposed on the outboard side of the mounting arms. The arms of each flange may be interconnected by a web extending therebetween, if desired, or the arms may be formed by respective portions of a continuous flange.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. A wheel and brake assembly comprising a wheel support, a wheel rotatably mounted on the wheel support, a torque transfer member coupled to the wheel support for transfer of torque from the brake disk stack to the wheel support during braking, a brake disk stack supported on the torque transfer member, and an actuator assembly mounted on the wheel support for applying braking force to the brake disk stack, and wherein the brake disk stack and torque transfer member are removable from the wheel support without removal of the actuator assembly, the actuator assembly includes a plurality of actuator modules individually removably mounted to the wheel support, each actuator module includes a motor and a ram both carried by a respective housing, and the wheel support has at least one flange thereon to which the actuator modules are mounted.

2. A wheel and brake assembly as set forth in claim 1, wherein the brake disk stack is carried on the torque transfer member and removable therewith as a unit from the wheel support.

3. A wheel and brake assembly as set forth in claim 1, wherein the wheel support and the at least one flange are formed as a unitary piece.

4. A wheel and brake assembly as set forth in claim 3, wherein the actuator modules have a mounting flange secured to an outboard side of the at least one flange.

5. A wheel and brake assembly as set forth in claim 1 wherein the actuator modules have mounting flanges abutting axially outwardly facing mounting surfaces on the wheel support.

6. A wheel and brake assembly as set forth in claim 1, wherein the torque transfer member is a torque tube having a mounting ring, and wherein the mounting ring is retained on the wheel support by a retainer and a thrust bearing interposed between the retainer and the mounting ring.

7. A wheel and brake assembly as set forth in claim 1, wherein the torque transfer member is relatively rotatable on the wheel support, and the torque transfer member and wheel support include a cooperating lug and recess interengaged to transfer torque from torque transfer member to the wheel support.

8. A wheel and brake assembly as set forth in claim 7, including a load transducer interposed between the lug and recess for sensing the transferred braking load.

9. A wheel and brake assembly comprising a wheel support, a wheel rotatably mounted on the wheel support, a torque transfer member coupled to the wheel support for transfer of torque from the brake disk stack to the wheel support during braking, a brake disk stack supported on the torque transfer member, and an actuator assembly mounted on the wheel support for applying braking force to the brake disk stack, wherein the actuator includes a plurality of actuator modules individually removably mounted to the wheel support, and the actuator modules each include a motor and a ram carried by a respective housing, and the housing of each actuator module has at least one mounting flange abutting an axially outwardly facing mounting surface on the wheel support.

10. A wheel and brake assembly as set forth in claim 9, wherein each actuator module further includes a rotary-to-linear motion transfer device connecting the motor to the ram, and wherein the reactionary axial loads caused by the motion transfer device are passed as compression loads from the motion transfer device to the mounting flange.

11. A wheel and brake assembly as set forth in claim 9, wherein the motor is an electric motor.

12. A wheel and brake assembly as set forth in claim 9, wherein the motor has a rotating drive shaft, and the axis of the rotating drive shaft extends perpendicular to the linear movement axis of the ram.

13. A wheel and brake assembly as set forth in claim 1, wherein the motor is an electric motor.

14. A wheel and brake assembly as set forth in claim 1, wherein the motor has a rotating drive shaft, and the axis of the rotating drive shaft extends perpendicular to the linear movement axis of the ram.

15. A wheel and brake assembly comprising a wheel support, a wheel rotatably mounted on the wheel support, a torque transfer member coupled to the wheel support for transfer of torque from the brake disk stack to the wheel support during braking, a brake disk stack supported on the torque transfer member, and an actuator assembly mounted on the wheel support for applying braking force to the brake disk stack, and wherein the brake disk stack and torque transfer member are removable from the wheel support without removal of the actuator assembly, the torque tube transfer member includes a torque tube telescoped over the wheel support, the torque tube has a radially inwardly extending mounting flange, and the flange is retained on the wheel support by a retainer nut threaded onto the wheel support.

16. A wheel and brake assembly as set forth in claim 15, wherein the torque tube is relatively rotatable on the wheel support, and the torque tube and wheel support include a cooperating lug and recess interengaged to transfer torque from the torque transfer member to the wheel support.

17. A wheel and brake assembly as set forth in claim 16, wherein a thrust bearing is interposed between the retainer and the mounting ring.

18. A wheel and brake assembly as set forth in claim 16, including a load transducer interposed between the lug and recess for sensing the transferred braking load.

\* \* \* \* \*